Sept. 12, 1944.  J. C. CANTLEY  2,357,874
CLUTCH
Filed July 21, 1942
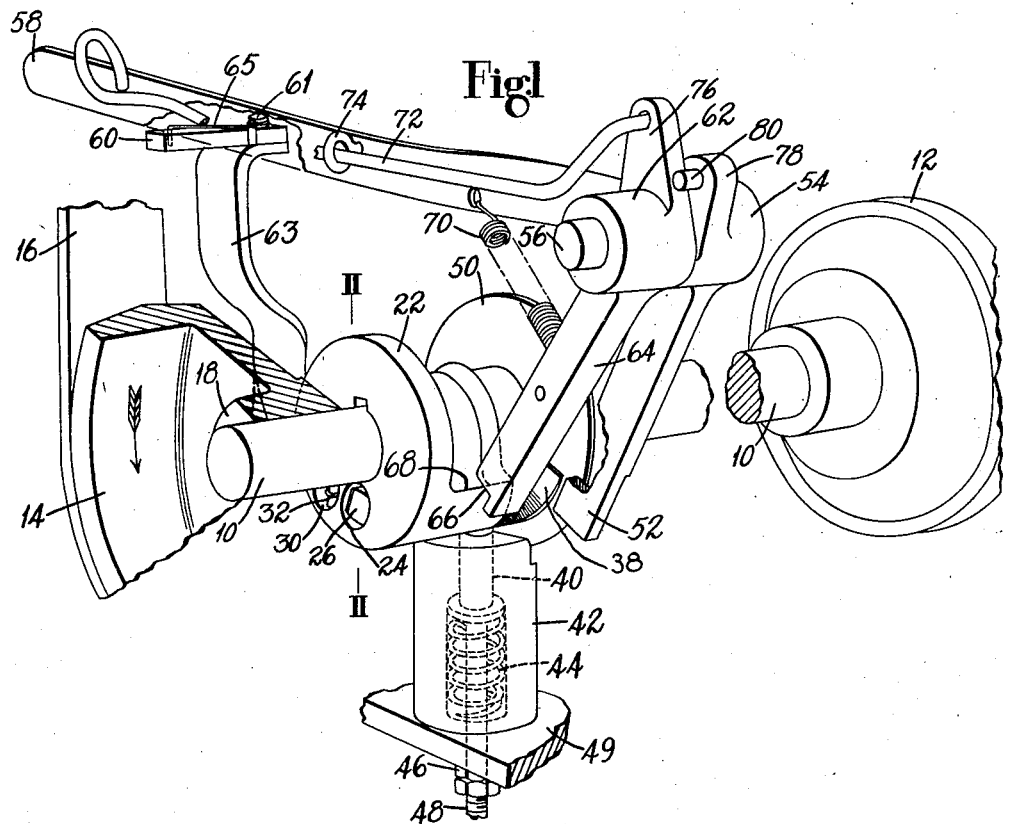
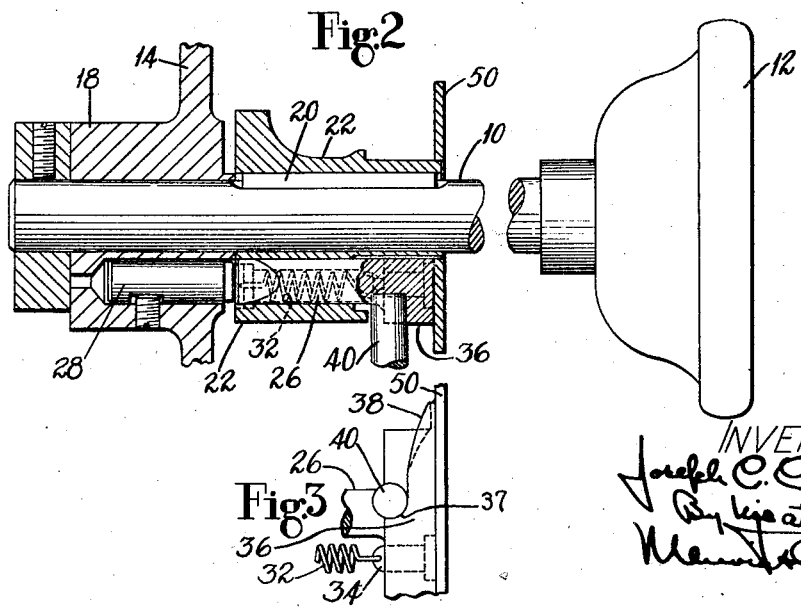
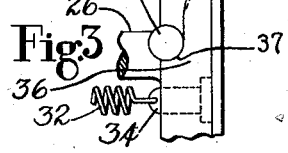

Patented Sept. 12, 1944

2,357,874

UNITED STATES PATENT OFFICE 2,357,874

CLUTCH

Joseph C. Cantley, Beverly, Mass., assignor to United Shoe Machinery Corporation, Flemington, N. J., a corporation of New Jersey Application July 21, 1942, Serial No. 451,793

3 Claims. (Cl. 192—25)

This invention relates to clutches and is herein illustrated and described as embodied in a safety device for a clutch of the type wherein a driven element is coupled to a driving element by a spring-pressed pin. Clutches of this type are commonly used to connect the driving shaft of a machine with a constantly running pulley. It is often necessary for the operator to make certain preliminary adjustments while the machine is idle, and in such cases the accidental tripping of the clutch might cause injury. It is also necessary in some cases for the operator to make these adjustments while turning the main shaft slowly by hand. Inasmuch as the main shaft cannot be turned without causing the clutch to engage, it is a common practice to slip the driving belt off its pulley. For example, in the machine disclosed in United States Letters Patent No. 2,302,738 granted November 24, 1942, upon an application filed in the name of Frederic E. Bertrand, the operator can determine the proper height of adjustment of the knives only by turning the hand wheel with which the machine is provided for that purpose; but in order to turn the hand wheel without engaging the clutch, he must slip the belt off its pulley.

It is an object of the present invention to provide a safety device for clutches which will enable the operator to turn the main shaft of the machine without removing the driving belt and which also, when desired, will positively lock the main shaft against rotation in its normal stopped position. The clutch illustrated herein is provided with means for holding the clutch pin out of clutch-engaging position and also for positively preventing rotation of the driven clutch element when the clutch is disengaged, both means being operable through a common handle. As shown herein, the means for holding the clutch pin in inoperable position comprises an abutment in the form of a disk coaxial with the clutch and carried by the clutch pin, in combination with a member which may be moved into a position to engage the disk to prevent axial movement of the disk and therefore of the clutch pin into clutch-engaging position. It is evident that this disk will serve to hold the clutch pin out of operative position while the main shaft is being turned through 360° by the operator.

The illustrated means for positively preventing rotation of the driven clutch element consists of a radially extending abutment on the driven clutch element which is engaged by an arm to prevent the shaft from being driven frictionally from the constantly running drive pulley. The operator is thus relieved of having to hold the shaft by hand against the tendency of the pulley to turn the shaft by friction, and he thus has both hands free to make such adjustments as are made with the shaft stationary. The device, as shown herein, is further provided with means for enabling the operator to release the positive holding means to enable him to turn the shaft while the clutch pin is held out of engaging position by the above-mentioned disk.

With the above and other features and objects in view, the invention will now be described in connection with the accompanying drawing and will be pointed out in the claims.

In the drawing,

Fig. 1 is an angular view of the improved safety device applied to a clutch;

Fig. 2 is a longitudinal sectional view, taken on the line II—II of Fig. 1, of the shaft and clutch mechanism to which the safety device is applied; and Fig. 3 is a bottom plan view of some of the parts shown in Fig. 2.

The improved safety device and the clutch with which it is associated are shown in the drawing in relation to a shaft 10. This shaft may be the principal driving shaft of any machine; for example, it may be the cam shaft of the machine disclosed in the above-mentioned Patent No. 2,302,738. While the shaft 10 is supported in the usual bearings, no showing of these bearings is considered necessary for present purposes and the cams or other operating elements associated with the shaft likewise are not shown. Secured upon one end of the shaft 10 is a hand wheel 12 by which the shaft may be turned slowly to enable certain adjustments to be made. Freely rotatable upon the other end of the shaft 10 is a pulley 14 constantly driven from a belt 16 in the direction indicated by the arrow in Fig. 1 and having a hub 18. Securely fixed on the shaft 10 by a key 20 against relative rotation and also against relative axial movement is a clutch member 22. Slidably mounted in a recess 24 formed in the clutch member 22 and extending parallel to the shaft 10 is a clutch pin 26. Set into the hub 18 of the pulley is a pin 28 adapted to engage the end of the clutch pin 26 to couple the clutch member 22 and thereby the shaft 10 to the rotating pulley 14.

On one side of the recess 24 and parallel thereto is a recess 30 within which is housed a tension spring 32. The end of the tension spring adjacent to the pulley 14 is anchored by a pin to the clutch member 22. The other end of the tension spring is anchored to a pin 34 carried by a block 36 which constitutes an extension of the clutch pin 26 outside the clutch member 22. The block 36 extends in an arc about the axis of the shaft 10, and is tapered to form a cam surface 38 (Fig. 1) which is engageable with a pin 40 vertically slidable in a block 42. The pin 40 is normally held up by a spring 44 housed within the block 42, the upward movement of the pin being limited by a stop nut 46 threaded upon a treadle rod 48 which extends downwardly from the pin 40. The stop nut 46 engages the under surface of a support 49 for the block 42.

In the operation of the clutch mechanism above described, the pin 40 (Fig. 3) engages a stop shoulder 37 on the block 36 to hold the block against the tension of the spring 32 and also to prevent forward rotation of the shaft 10. Upon depression of the treadle, the pin 40 will be withdrawn and the spring 32 will thereupon urge the clutch pin 26 to the left into position for engagement with the pin 28. The rotation of the hub 18 will then bring the pin 28 into engagement with the clutch pin, causing the shaft to be driven in the direction of the arrow shown in Fig. 1. Upon release of the treadle, the spring 44 will return the pin 40 to its upper, stop, position where it will be engaged by the cam surface 38. Further rotation of the shaft 10 will cause the cam surface 38 to slide up on the pin 40 and thereby withdraw the clutch pin 26 from the pin 28 to uncouple the shaft 10 from the pulley. When the shaft has been uncoupled, its further rotation will be stopped by the above-mentioned shoulder on the block 36 engaging the pin 40.

In order to provide for holding the clutch pin out of engagement with the pulley independently of the clutch release pin 40, there is provided an abutment 50 in the form of a disk concentric with the shaft 10 and secured upon the block 36. This disk is engaged by a stop in the form of an arm 52 extending from a hub 54 which is mounted for pivotal movement upon a stationary shaft 56 parallel to the shaft 10. Extending from the hub 54 to a location conveniently accessible to the operator is a handle 58. The outer end portion of the handle 58 is held up by a latch 60 pivotally mounted upon an upright pin 61. A bracket 63 supports the latch, and a spring 65 normally holds the latch in operating position. When the handle 58 is thus supported by the latch 60, the arm 52 overlaps the disk 50 to prevent engagement of the clutch pin. When operation of the machine is desired, the latch 60 is swung to an out-of-the-way position and the handle 58 is lowered. Also pivotally mounted upon the shaft 56 is a hub 62 from which extends an arm 64 serving as a stop. The lower end of the arm 64 has formed in it a notch 66 which engages an abutment or shoulder 68 formed on the clutch member 22. The shoulder 68 is a radial surface extending parallel to the axis of the shaft and its engagement with the notch 66 positively prevents forward rotation of the shaft 10. The arm 64 is held in its engaging position by a tension spring 70 interposed between the handle 58 and the arm 64. For releasing the arm 64 there is provided a rod 72 extending parallel to the handle 58 and supported by an eye-bolt 74 carried by the handle. The rod 72 is pivotally connected to an arm 76 extending upwardly from the hub 62. It is evident that the operator by pulling the end of the rod 72 can release the arm 64 to permit the shaft 10 to be turned. However, in order to insure moving of the arm 64 automatically to an out-of-the-way position when the handle 58 is depressed, the hub 54 is provided with an upwardly extending arm 78 which carries a pin 80 engageable with the arm 76 on the hub 62.

Assuming the various parts of the device to be in the positions shown in the drawing, the operation of the above-described safety device will readily be understood from the foregoing description. When adjustments are to be made which require the slow forward turning of the shaft 10 by the hand wheel 12, for example the heightwise adjustment of the knives disclosed in Patent No. 2,302,738 above mentioned, the operator depresses the treadle to release the pin 40. In the absence of a safety device withdrawal of the pin 40 would immediately start the rapid rotation of the shaft 10 under power. In order to prevent the shaft from thus being driven, it has been customary to slip the belt 16 off the pulley 14. However, the arm 52 with which the clutch is now provided will be engaged by the face of the disk 50 and will thus hold the clutch pin out of engagement notwithstanding withdrawal of the pin 40. The operator now pulls the rod 72 to release the arm 64. The shaft is then free to turn, and the operator may turn it by the hand wheel 12 while making the required adjustments. There may be certain other adjustments, however, which are best made with the shaft 10 stationary in its stopped position; for example, the removal or replacement of the knives of the machine disclosed in Patent No. 2,302,738 above mentioned. In such cases, the arm 64 may be brought into its operative position to engage the shoulder 68, thus locking the shaft 10 against accidental forward movement, and particularly against the tendency of the constantly running pulley 14 to drive the shaft by friction. The operator is then free to use both hands in making the adjustments. When he desires to start the machine, the operator swings the latch 60 to an inoperative position and depresses the handle 58 whereupon depression of the treadle will cause the clutch to be coupled to the pulley in the usual way.

Having thus described my invention, what I claim as new and desire to secure by Letters Patent of the United States is:

1. In a clutch of the type wherein a driven element is coupled to a driving element by a pin urged by a spring in a direction parallel to the axis of the clutch into clutch-engaging position, a safety device comprising an abutment on the clutch pin, an arm engageable with said abutment to hold the clutch pin out of engaging position, an abutment on the driven clutch element, an arm engageable with the second-mentioned abutment to positively prevent rotation of the driven clutch element, a common means for moving said arms out of engagement with their abutments when engagement of the clutch is desired, and means for moving the second-mentioned arm out of engagement with its abutment while leaving the first-mentioned arm in engagement with its abutment to enable the driven cluch element to be turned by hand with the clutch disengaged.

2. In a clutch of the type wherein a driven element including a shaft is coupled to a driving element by a pin carried by the driven element and slidable in a direction parallel to the axis of the shaft, a safety device comprising a lever, a fulcrum on which said lever is pivotally mounted, an abutment on said clutch pin engageable with said lever to hold the pin in clutch-disengaged position, a latch for holding said lever in a position of engagement with said abutment, a handle for moving the lever into operative position to hold the clutch disengaged or into inoperative position to permit engagement of the clutch, a second lever pivotally mounted on said fulcrum, an abutment extending radially from the driven clutch element and engageable with the second-mentioned lever to positively prevent rotation of the driven clutch element, a spring interposed between said levers for yieldably holding the second-mentioned lever in operative position when the first-mentioned lever is held in operative position by said latch, a handle for moving the second-mentioned lever into inoperative position against the force of said spring to permit manual turning of the shaft while the clutch is disengaged, and a stop on one of said levers engageable with the other lever for enabling the first-mentioned lever, upon movement to a position permitting engagement of the clutch, to move the second-mentioned lever away from engagement with said radial abutment to permit rotation of the shaft when the clutch is engaged.

3. A clutch comprising a driving element, a driven element, a coupling member having a driving connection with the driven clutch element and being movable in the direction of the axis of the clutch into and out of driving engagement with the driving clutch element, an abutment on said coupling member, a stop engageable with said abutment to prevent movement of the coupling member into driving engagement with the driving clutch element, a handle for disengaging said stop from said abutment, an abutment on the driven clutch element, a stop engageable with the second-mentioned abutment to prevent undesired rotation of the driven clutch element, a handle for controlling the engagement of the second-mentioned stop with the second-mentioned abutment, and a connection between said stops for disengaging one of said stops upon a disengaging movement of the other stop, said connection being constructed and arranged to permit a disengaging movement of one of the stops independently of the other stop.

JOSEPH C. CANTLEY.